UNITED STATES PATENT OFFICE.

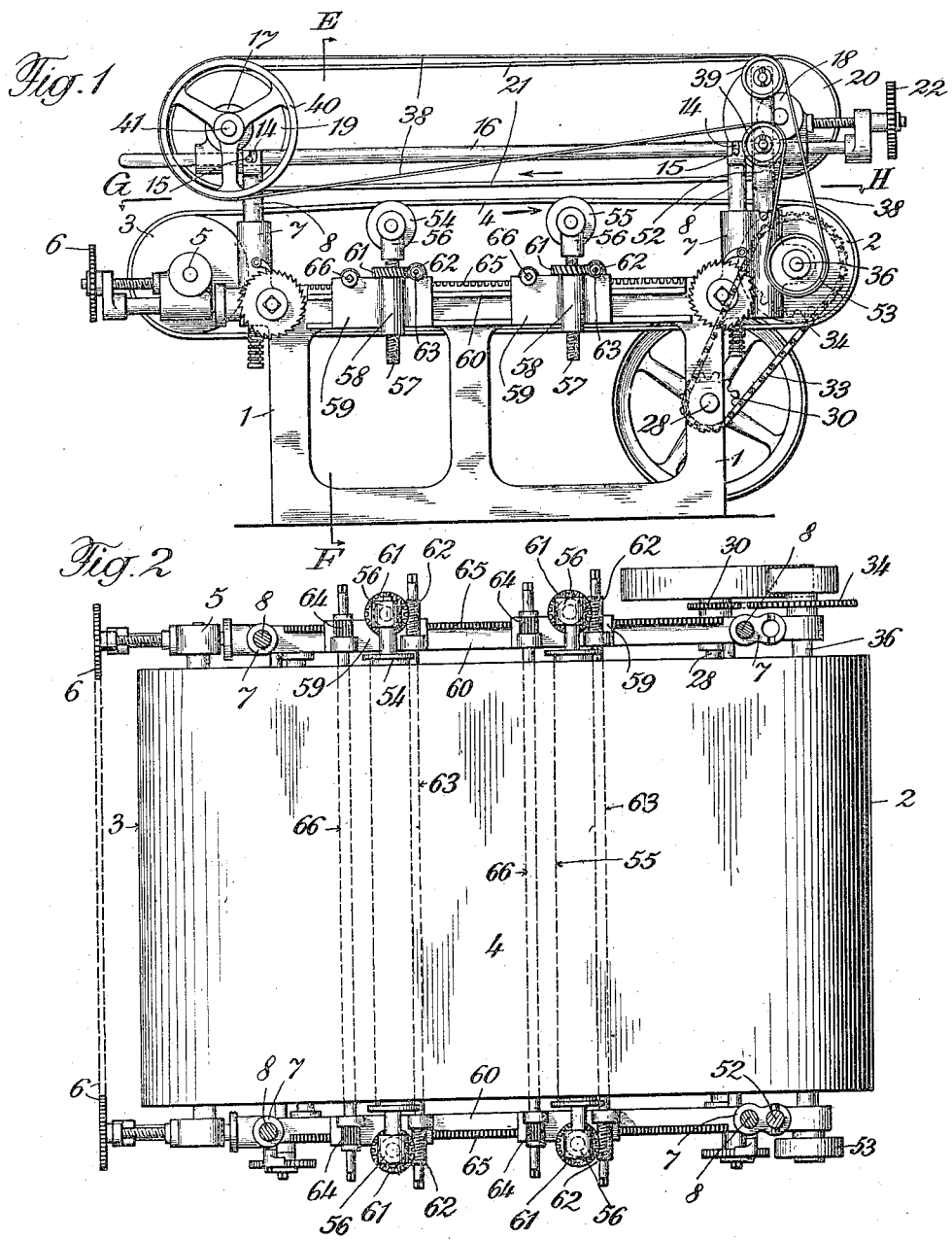

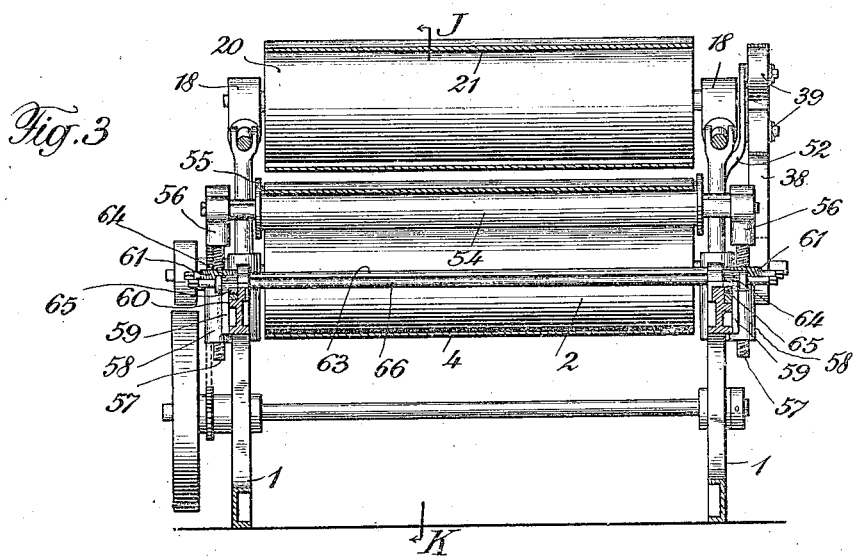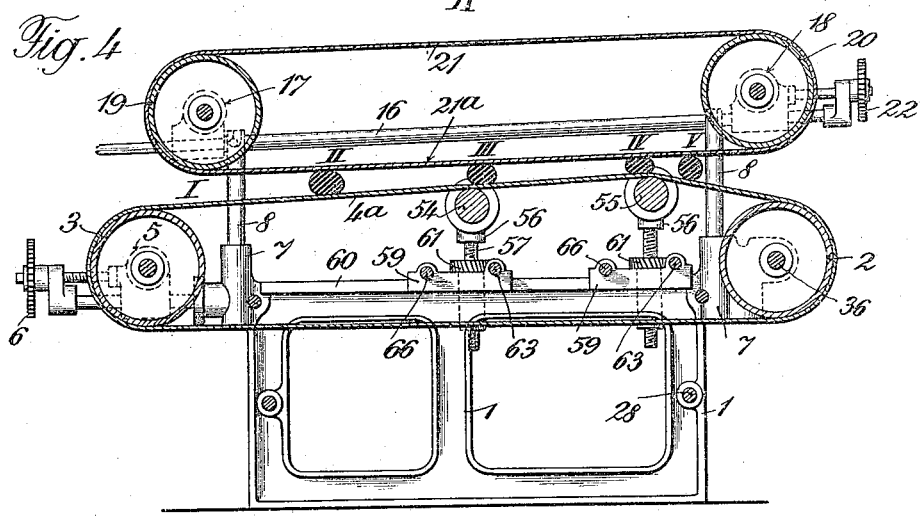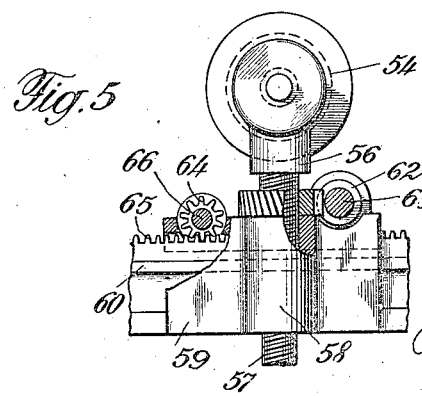

FRIEDRICH AESCHBACH, OF AARAU, SWITZERLAND.

MACHINE FOR MOLDING PIECES OF DOUGH.

1,252,765. Specification of Letters Patent. Patented Jan. 8, 1918.

Original application filed July 3, 1916, Serial No. 107,438. Divided and this application filed January 23, 1917. Serial No. 144,045.

*To all whom it may concern:*

Be it known that I, FRIEDRICH AESCHBACH, a citizen of the Republic of Switzerland, residing at Aarau, Canton of Aargau, Switzerland, have invented certain new and useful Improvements in Machines for Molding Pieces of Dough; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification, being a division of my application for United States Patent, filed July 3rd, 1916, Serial No. 107,438.

In my previous patent application Ser. No. 107,438 I have described a machine for molding pieces of dough, that is for working and shaping dough, having a pair of endless bands arranged one upon another and between which the dough pieces are worked and shaped.

The present invention has reference to a machine of this type. The machine according to this invention is adapted for being used for different kinds of works and to produce final products of different shape.

The accompanying drawings illustrate a convenient mode of carrying the present invention into effect.

Figure 1 is a side view of the machine.

Fig. 2 is a section on the line G—H of Fig. 1.

Fig. 3 is a section on the line E—F of Fig. 1.

Fig. 4 is a section on the line J—K of Fig. 3 and

Fig. 5 shows a detail of the machine.

4 denotes the lower endless band running over the rollers 2, 3 supported in the machine frame 1. For the purpose of stretching the band 4 the bearings 5 of the roller 3 (Figs. 1 and 2) may be adjusted in an equal manner by means of a chain drive 6. 8 are supports adapted to be moved in vertical guides 7 (Figs. 1 and 2). The upper end of the supports 8 is fork shaped (Fig. 3) and each of these ends is provided with a slot 14 (Fig. 1). The lower part of the slots 14 of the supports 8 disposed on the left hand side of the machine is bent sideward in the same manner as it is the case in a bayonet-joint. The slots 14 are adapted to receive the pins 15 of rods 16 carrying bearings 17 and 18 (Figs. 1 and 4) for rollers 19 and 20. 21 denotes the upper endless band, which runs over the rollers 19 and 20. This band 21 is arranged parallel to the band 4. The bearings 18 may also be adjusted simultaneously and in an equal manner by means of a chain drive 22 (Fig. 1).

28 denotes a main driving shaft carrying a chain wheel 30 over which runs a chain 33. The latter passes also over a chain wheel 34 fixed to a shaft 36. The latter carries at the opposite end a pulley 53 (Fig. 2).

An endless belt 38 (Fig. 1) guided in an appropriate manner by means of pulleys 39 passes over a pulley 40, which is fixed to the shaft 41 of the roller 19, and the pulley 53. The guide pulleys 39 are movably mounted on an arm 52.

It will be seen, that upon a rotation of the shaft 28 the bands 4 and 21 are continually moved in the direction of the arrows shown in Figs. 1 and 4, band 21 traveling at about half the speed of band 4, as the diameter of pulley 53 is about half the diameter of pulley 40, so that the dough pieces are rolled between these bands into long cylinders giving long breads.

In a machine of the above described type it is also possible to give to the dough pieces during their working different forms without the prescribed form, which has to be given to the pieces leaving the machine, being affected in any way. This will be best understood by referring particularly to Figs. 4 and 5. 21$^a$ and 4$^a$ are the adjacent parts of the parallel bands 4 and 21. As shown, the belt part 21$^a$ forms a stretched straight path, while the part 4$^a$ of the belt 4 is pushed out at certain places of the stretched straight path and moved toward the belt part 21$^a$, so that the distance between the two belt parts 21$^a$ and 4$^a$ is different at different places. Said pushing out is effected by means of cylindrical guide pulleys 54 and 55 movably mounted at both ends in bearings 56, which rest on shafts 57 (Fig. 5). The latter are guided in sleeves 58 fixed to slides 59 adapted to be moved along guide-piece 60. Each shaft 57 works together with a worm-wheel 61, which forms a nut and is adapted to be rotated by means of a worm 62. Suitable means prevent any displacement of said worm-wheels 61 in the axial direction of the shafts 57. The worms 62 of two opposite slides 59 are connected by means of a rod 63 adapted to be rotated by hand. On each slide 59 is also movably mounted a small toothed wheel 64 working together with a rack 65 fixed to the guide-piece 60. Two opposite toothed wheels 64 are always connected by means of a rod 66 adapted to be rotated by hand. Upon a rotation of a shaft 63 it is thus possible to adjust vertically a guide pulley 54, while upon a rotation of a shaft 66 a horizontal adjustment of one of the guide pulleys may be effected.

The piece of dough having quite an irregular shape comes at I in contact with the band parts 4$^a$ and 21$^a$ and is then formed into an approximately cylindrical dough roll II. Hereupon a greater pressure is exerted upon this piece of dough, said pressure increasing from point III to point IV. This increase of the pressure at certain places is particularly of advantage for the treatment of the so called skin of the piece of dough. As soon as the piece of dough is moved behind the guide pulley 55 toward the position V a gradual decrease of the pressure acting upon this piece takes place, so that said piece assumes again more a cylindrical shape.

What I claim is:

1. In a molding machine for dough, two endless bands arranged parallel one upon another, each band running over two rollers, a plurality of guiding means adapted to guide the inner side of one band between its two rollers at different points at different distances from the inner side of the other endless band, means to adjust each of said guiding means in a vertical direction and means whereby said guiding means may be moved longitudinally of the bands.

2. In a molding machine for dough, two endless bands arranged parallel one upon another, each band running over two rollers, a plurality of guide pulleys arranged parallel to said rollers and operating on the inner side of the lower band between its two rollers to guide said side at different points at different distances from the inner side of the upper endless band, a support for each end of the guide pulleys, means for moving the supports of each pulley independently of the supports of the other pulleys in a vertical direction and means whereby said supports may be moved longitudinally of the bands.

3. In a molding machine for dough, two endless superposed parallel bands, each running over two rollers, a plurality of guide-pulleys arranged parallel to said rollers and operating on the inner side of the lower band between its two rollers to guide said side at different points at different distances from the inner side of the upper endless band, a bearing for each end of said guide-pulleys, a slide for each of the bearings, a worm wheel on each bearing, hand operated means adapted to impart to the two bearings of each guide-pulley a simultaneous vertical movement by working together with said worm wheels, two horizontal guide pieces arranged on both sides of the machine in the longitudinal direction of the latter and each carrying the slides on that side of the machine, and hand operated means adapted to move simultaneously the slides carrying the two bearings of a guide pulley along the horizontal guide pieces.

In testimony that I claim the foregoing as my invention, I have signed my name in presence of two subscribing witnesses.

FRIEDRICH AESCHBACH.

Witnesses:
 ARNOLD LEHNEY,
 CARL GUBLER.